(12) United States Patent
Holland et al.

(10) Patent No.: US 10,796,873 B2
(45) Date of Patent: Oct. 6, 2020

(54) FUSIBLE LINK IN BATTERY MODULE VOLTAGE SENSING CIRCUIT

(71) Applicant: NIO USA, Inc., San Jose, CA (US)

(72) Inventors: Stephen C. Holland, San Jose, CA (US); Alexander J. Smith, Mountain View, CA (US)

(73) Assignee: NIO USA, Inc., San Jose, CA (US)

( * ) Notice: Subject to any disclaimer, the term of this patent is extended or adjusted under 35 U.S.C. 154(b) by 90 days.

(21) Appl. No.: 15/843,566

(22) Filed: Dec. 15, 2017

(65) Prior Publication Data

US 2019/0189382 A1    Jun. 20, 2019

(51) Int. Cl.
*H01H 85/11*    (2006.01)
*H01H 85/02*    (2006.01)

(52) U.S. Cl.
CPC ........ *H01H 85/11* (2013.01); *H01H 85/0241* (2013.01); *H01M 2200/103* (2013.01)

(58) Field of Classification Search
CPC .... H01H 85/0241; H01H 85/10; H01H 85/11; H01H 85/046; H01H 85/08; H01H 85/12; H01H 2085/025; H01M 2200/103
USPC .......................................................... 337/186
See application file for complete search history.

(56) References Cited

U.S. PATENT DOCUMENTS 5,471,163 A * 11/1995 Childers .............. B41J 2/17526
327/525
8,922,959 B2   12/2014 Cho et al.
2003/0156829 A1 * 8/2003 Cox ...................... H05B 3/14
392/390
2005/0006718 A1 * 1/2005 Hanji .................. H01L 23/5258
257/529
2010/0130029 A1 * 5/2010 Williams ............. H05K 1/0293
439/65
2013/0076478 A1 * 3/2013 Christmann ......... H01H 85/055
337/293
2013/0323548 A1 * 12/2013 Iwamoto ............... H01M 2/348
429/62
2014/0212695 A1    7/2014 Lane et al.
2014/0356671 A1    12/2014 Dawley et al.
2016/0351868 A1 * 12/2016 Eom .................... H01M 2/1022
2016/0358849 A1 * 12/2016 Jur ....................... H05K 1/0283
2016/0365562 A1 * 12/2016 Sugiyama ............. H01M 2/206
2017/0003349 A1    1/2017 Dawley et al.

* cited by examiner

*Primary Examiner* — Jacob R Crum
(74) *Attorney, Agent, or Firm* — Sheridan Ross P.C.

(57) ABSTRACT

Devices and systems are provided that incorporate fusible links within the electrical traces of a battery module voltage sensing circuit. The fusible links can be integrally formed in an electric trace and provide an overcurrent protection feature for the circuit without requiring fuse elements or components that are separate from the electrical trace. Each of these fusible links include a substantially flat controlled cross-sectional area disposed along a length of the material making up the electrical trace. In an overcurrent situation, the connection between a battery management system and a battery cell may be severed by the overcurrent melting the fusible link. The electrical traces may be spaced apart from one another in the circuit such that an overcurrent situation breaking the connection between one cell and the battery management system would not affect adjacent electrical traces not having an overcurrent situation.

20 Claims, 4 Drawing Sheets

FUSIBLE LINK IN BATTERY MODULE VOLTAGE SENSING CIRCUIT

FIELD

The present disclosure is generally directed to battery module electrical connections, in particular, toward battery module circuits including current overload protective features.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of battery cells. These battery cells are typically connected to an electrical control system to provide a desired available voltage, ampere-hour, and/or other electrical characteristics. In some cases, the battery cells may be connected to a battery management system configured to monitor the voltage sensed from each cell in a battery module and/or a battery pack.

The battery cells may include a number of internal or external protective devices such as pressure, temperature, current (PTC) switches, current interrupt devices (CID), vents, fuses, and/or protection circuit boards. Many of these devices are intended to prevent over-temperature, high pressure, current surges, and/or over-charges. However, the systems are prone to failure and tend to be unreliable in certain environmental conditions.

DETAILED DESCRIPTION

Figure 1:
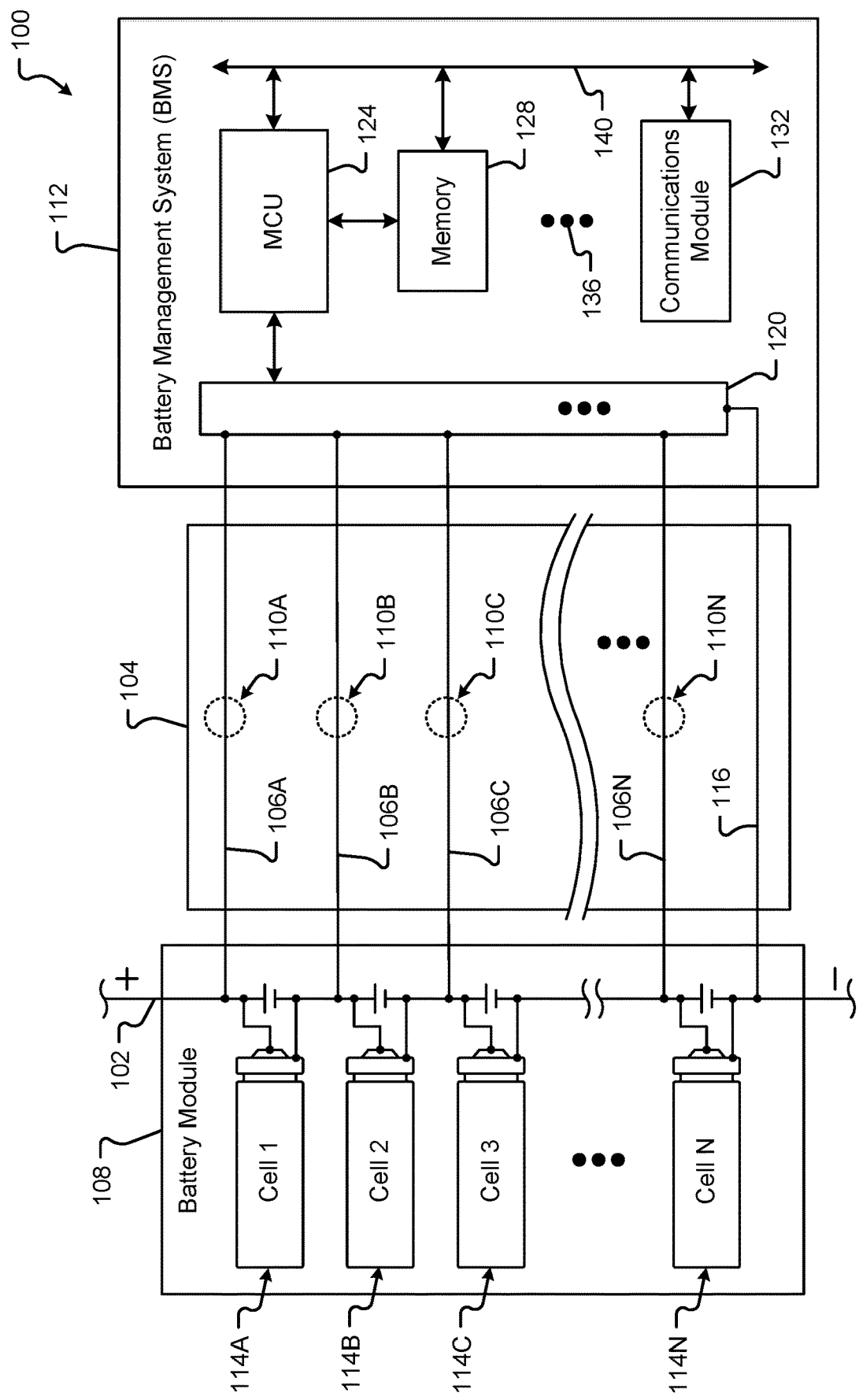
FIG. 1 is a block diagram of a battery module voltage sensing system in accordance with embodiments of the present disclosure.

Embodiments of the present disclosure will be described in connection with electrical connection circuits, and in some embodiments an electrical interconnect device disposed between a battery management system and a number of battery cells in an electric vehicle energy storage system.

Battery cells may be connected to one another and/or attached to a busbar of a battery system via a number of electrical interconnections. These electrical interconnections are generally made between the positive and/or negative terminals of a battery cell and respective positive and/or negative connection points on the busbar. In general, the positive terminal may be disposed on a first end of a battery cell and the negative terminal may be disposed on an opposite second end of the battery cell. In some embodiments, the negative terminal of the battery cell may be found on any conductive portion of the can, or housing, of the battery cell. This housing may be electrically separated and/or isolated from the positive terminal via at least one electrical insulating element (e.g., gasket, non-conductive material, etc.).

Typically, cylindrical battery cells include a button cap, or cover, corresponding to the positive terminal. The button cap is made from a conductive material and can include a formed portion, or protrusion, extending in an axial direction of the cylindrical battery cell away from a center of the battery cell. Among other things, this formed portion of the button cap provides a raised platform for electrical interconnection to an electrical system. In the case of some electrical vehicle battery systems, the raised platform provides a surface to which an electrical interconnection, or tab, may be attached (e.g., welded, affixed, etc.).

Modern battery cells may include a number of safety features to protect against certain types of failures. These failures may include over temperatures, over pressure, and/or current surges. In some cases, a gas release vent may be built into a portion of the battery cell which can relieve pressure inside the battery cell and prevent rupture of the battery cell. The gas is generally released through one or more vent holes disposed in a portion of the battery cell, such as the button cap. Vent holes disposed in a button cap are typically arranged around a periphery of the raised platform and sized such that an amount of gas may be released without compromising the structural integrity of the button cap during welding or other attachment operations.

Many of the safety and/or protection features currently used in modern battery cells fail to reliably operate over a wide range of environmental conditions such as high-temperature, high-humidity and/or wet environments. Moreover, the safety features may not be reliable in certain battery cell arrangements and/or configurations (e.g., series and/or parallel arrangement and attachment of multiple battery cells in a battery system, etc.). It is as aspect of the present disclosure to address these shortcomings by including fusible elements in the main voltage sensing lines of the battery management system of the battery module. While conventional external fusible elements may be arranged as discrete elements, systems, or components that are separate from the interconnection between the battery cells of a battery module and the battery management system (e.g., wire bonding, printed circuit board (PCB) mounted fuses, in-line fuses, etc.) the present disclosure describes embodiments where a fusible link is integrally formed in the PCB, flexible PCB, and/or flexible circuit connecting the battery module with the battery management system. In some embodiments, the fusible link may be formed by reducing a trace cross-sectional area in a targeted region of the voltage sensing line, the reduced cross-sectional area configured to provide a fuse. This fusible link may be between the battery cell, or cell group, and the battery monitoring electronics, or battery management system (BMS).

It is with respect to the above issues and other problems that the embodiments presented herein were contemplated. It is an aspect of the present disclosure to provide methods, devices, and systems that incorporate and support a number of physical fusible links disposed in an electrical interconnection between one or more battery cells and/or battery modules and a BMS.

Rather than requiring separate fuse elements (e.g., wire bonds, inline fuses, PCB mounted fuses, etc.) that are attached to various electrical components during conventional electronics assembly, the present disclosure offers the benefits and advantages of an integral fusible link solution built into a circuit. In modern electric vehicle battery systems hundreds, if not thousands, of individual battery cells may make up each battery module and/or vehicle battery. Adequately managing this number of battery cells requires changes to simple wire cabling and traditional monitoring systems. The present solution offers an elegant, robust, and thin design that does not add a thickness to a circuit and does not require additional assembly steps and/or components. Moreover, the disposition of the fusible links between insulation layers of a printed circuit, provides added protection against fire, contamination, and can event prevent damage to adjacent traces in the printed circuit.

In some embodiments, the fusible links may be integrated into the printed circuit during assembly of the printed circuit resulting in a substantially flat package having integrated safety features. Although described in conjunction with a circuit disposed between one or more battery cells and a battery management system, it should be appreciated that the fusible link embodiments described herein may be used in any energy system or power circuit. The present disclosure recites battery cells and/or battery modules as an example of an energy storage device in a circuit, but the description should not be so limited. For example, the energy storage devices may include, but are in no way limited to, batteries, capacitors, ultracapacitors, supercapacitors, etc., and/or combinations thereof.

Referring to FIG. 1, a block diagram of a battery module voltage sensing system 100 is shown in accordance with embodiments of the present disclosure. The battery module voltage sensing system 100 may include a printed circuit 104 electrically connecting a battery module 108 to a battery management system (BMS) 112. The printed circuit 104 may be a rigid PCB or a flexible PCB, or flex circuit.

The printed circuit 104 may include at least one substrate layer (e.g., dielectric or insulation layer) upon which a number of electrical traces 106A-N, 116 may be formed. In one embodiment, the electrical traces 106A-N, 116 of the printed circuit 104 may convey electrical voltage and/or current from a source to a destination, and vice versa. The electrical traces 106A-N, 116 may be configured to provide electrical energy from one or more battery cells 114A-N in the battery module 108 to a BMS 112 or other electrical system. In one embodiment, the number of electrical traces 106A-N, 116 used by the BMS 112 to monitor a state of charge, voltage, or other electrical characteristic associated with one or more battery cells 114A-N in the battery module 108 may equal the number of battery cells 114A-N in the in the battery module 108 plus one. For instance, where the battery module 108 includes eighty battery cells 114A-N, the number of electrical traces 106A-N in the printed circuit may be at least eighty-one. This arrangement allows information from each battery cells 114A-N in the in the battery module 108 to be conveyed to the BMS 112 for monitoring and/or control.

It is an aspect of the present disclosure that fusible links 110A-N may be integrally formed along a section, or length, of one or more of the electrical traces 106A-N, 116 of the printed circuit 104. The fusible links 110A-N may provide an integrated overcurrent protection feature in the electrical traces 106A-N, 116. The fusible links 110A-N may include a controlled cross-sectional area disposed along a length of the electrical trace material making up the fusible link 110A-N. The controlled cross-sectional area may define the overcurrent melt area of the fusible links 110A-N. For instance, in the event an installed battery cell 114A-N experiences a surge of current over a particular threshold value, the connection from the BMS 112, or other electrical system, to the battery cell 114A-N may be severed by the current melting the fusible links 110A-N at the controlled cross-sectional area. This melting may physically separate and electrically disconnect the battery cell 114A-N from a busbar 120, or other component, of the BMS 112. In some embodiments, the controlled cross-sectional area may correspond to a reduced cross-sectional area of the fusible link 110A-N. For example, the fusible link 110A-N may step down, or decrease, from a first cross-sectional area (e.g., of the electrical trace 106A-N, 116, etc.) to a second cross-sectional area that is less than the first cross-sectional area.

In some embodiments, the battery module 108 may comprise a number of battery cells 114A-N. The battery cells 114A-N in the battery module 108 may be connected in parallel, series, or a combination thereof. Each battery cell 114A-N may comprise a housing, a top portion, a bottom portion, and one or more terminals. As shown in FIG. 1, a first terminal may correspond to a positive terminal disposed at the top portion of the battery cell 114A-N. In some embodiments, the battery cell cap may correspond to the positive terminal of the battery cell 114A-N. In one embodiment, a second terminal may correspond to the negative terminal of the battery cell 114A-N. The second terminal may be disposed opposite the positive terminal (e.g., at the bottom portion 114A-N of the battery cell 114A-N). In one embodiment, the second terminal may be disposed on a side of the battery cell 114A-N other than the bottom portion. As provided above, the second terminal of the battery cell 114A-N may be found on any conductive portion of the can, or housing, of the battery cell 114A-N. This housing may be electrically separated and/or isolated from the positive terminal via at least one electrical insulating element (e.g., gasket, non-conductive material, etc.).

The first terminal, or battery cell cap, may be insulated from the second terminal, or other part of the battery cell 114A-N, via an insulation element. The insulation element may be configured to electrically isolate the first terminal from the second terminal, housing, or other part of the battery cell 114A-N. In some embodiments, the insulation element 116 may be made from a plastic, cardboard, paper, linen, composite, or other non-conductive material.

In one embodiment, the battery cells 114A-N may be substantially cylindrical in shape. Additionally or alternatively, the battery cells 114A-N may be symmetrical about at least one axis. For example, the battery cells 114A-N may be substantially symmetrical about a center axis running from the top portion to the bottom portion of the battery cells 114A-N. The battery cells 114A-N may include one or more manufacturing features including, but in no way limited to, indentations, alignment marks, reference datum, location features, tooling marks, orientation features, etc., and/or the like. As shown in FIG. 1, a manufacturing feature of the battery cells 114A-N may be a rolled, or sealed, portion of the battery cells 114A-N (e.g., disposed near a top portion of the battery cell 114A-N).

In some embodiments, the battery cells 114A-N may be configured to store energy via one more chemicals contained inside the housing. The battery cells 114A-N may be rechargeable and may include one or more chemical compositions, arrangements, or materials, such as, lithium-ion, lead-acid, aluminum-ion, nickel-cadmium, nickel metal hydride, nickel-iron, nickel-zinc, magnesium-ion, etc., and/or combinations thereof. The positive terminal of each battery cell 114A-N may correspond to the cathode and the negative terminal may correspond to the anode. When connected to a busbar 102, current from the battery cells 114A-N may be configured to flow from the terminals of the battery cells 114A-N through the busbar 102 to one or more components of an electric power distribution system (not shown). This current flow may provide power to one or more electrical elements associated with an electric vehicle.

The battery module 108 may be one of a number of different battery modules 108 making up a multi-module battery. In some embodiments, each battery module 108 may include a corresponding BMS 112. In other embodiments, the multi-module battery comprising a number of battery modules 108 may be monitored and/or controlled by a single multi-module BMS.

The BMS 112 may include a busbar 120 including a number of terminals configured to interconnect with electrical traces 106A-N, 116 of the printed circuit 104. In some embodiments, the interconnection between the printed circuit 104 and the BMS 112 may be via a physical electrical connector disposed on the printed circuit 104, the BMS 112, and/or both the printed circuit 104 and the BMS 112. The BMS 112 may be configured to monitor and/or control a state of charge associated with each battery cell 114A-N in the battery module 108. In some embodiments, the BMS 112 may include a microcontroller unit (MCU) 124, including one or more processors, interconnected with a memory 128 via at least one connection, or communications bus 140. The memory 128 may be one or more disk drives, optical storage devices, solid-state storage devices such as a random access memory (RAM) and/or a read-only memory (ROM), which can be programmable, flash-updateable and/or the like. Additionally or alternatively, the BMS 112 may include a communications module 132 and/or other components 136 interconnected with the communication bus 140, charger (not shown), and/or other systems in an electric power distribution system (not shown). The communications module 132 may include a modem, a network card (wireless or wired), an infra-red communication device, etc. and may permit data to be exchanged with a network and/or any other charger or processor in the electric power distribution system as described.

In any event, pairs of electrical traces 106A-N, 116 may provide voltages from the battery module 108 to the MCU 124 of the BMS 112 and these voltages may be used to determine a state (e.g., voltage, current, state of charge, etc.) associated with a particular battery cell 114A-N in the battery module 108.

Examples of the processors as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex198-M processors, ARM® Cortex-A and ARM926EJ-S™ processors, Infineon TriCore™ processors, other industry-equivalent processors, and may perform computational functions using any known or future-developed standard, instruction set, libraries, and/or architecture.

Figure 2:
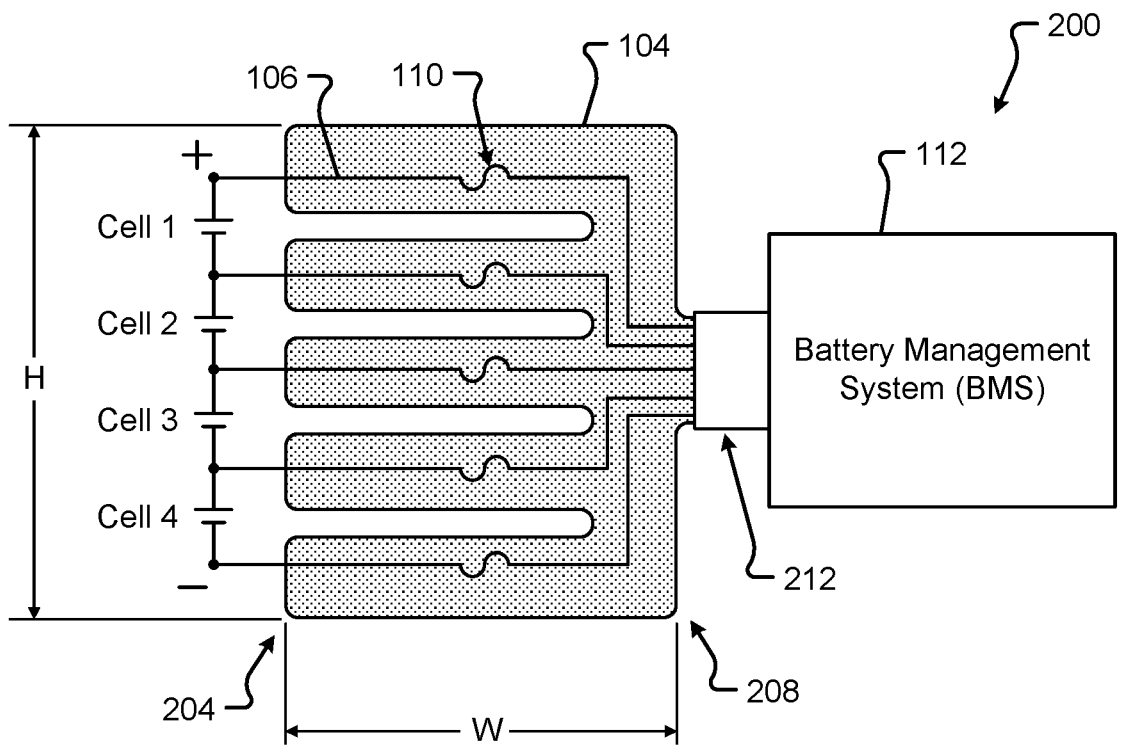
FIG. 2 is a schematic block diagram of a battery module voltage sensing system and printed circuit with integrated fusible links in accordance with embodiments of the present disclosure.

FIG. 2 is a schematic block diagram of a battery module voltage sensing system 200 including a printed circuit 104 with integrated fusible links 110 in accordance with embodiments of the present disclosure. The voltage sensing system 200 of FIG. 2 includes a series of battery cells (e.g., Cell 1, Cell 2, Cell 3, and Cell 4) associated with a battery module 108. As illustrated in the schematic diagram of FIG. 2, the battery cells of an example battery module 108 is shown as including only four battery cells for simplicity. It should be appreciated, that the interconnection devices described in the present disclosure may be used with battery modules 108 including any number of battery cells (e.g., by adding electrical traces 106, etc. to the printed circuit 104, etc.) and is not only limited to four battery cells as depicted in FIG. 2. Each electrical trace 106 is formed in the substantially planar printed circuit 104 running from a first end 204 to a second end 208. In some embodiments, the electrical traces 106 in the printed circuit 104 may be connected to the BMS 112 via one or more connectors 212.

The printed circuit 104 may have a height, H, and a width, W, defining a planar surface of the printed circuit 104. In some embodiments, this planar surface may correspond to the surface of a dielectric substrate layer upon which the electrical traces 106 and fusible links 110 may be formed. The electrical traces 106 and fusible links 110 may be silkscreened, printed, deposited, or otherwise formed from electrically conductive material on the dielectric layer. In one embodiment, the electrical traces 106 and fusible links 110 may be cut (e.g., laser cut, wire electrical discharge machined (EDM), waterjet cut, or otherwise machined) from a sheet of conductive material (e.g., copper, silver, etc.) and laid onto, adhered to, or laminated with at least one layer of the printed circuit 104. Each electrical trace 106 may have a uniform layer thickness. In some cases, the electrical trace 106 may include a constant width running along a length of the electrical trace 106 (e.g., from the first end 204 to the second end 208 of the electrical trace 106. In one embodiment, the electrical trace 106 may include a reduced width at the fusible link 110 portion of the electrical trace 106.

Figure 3:
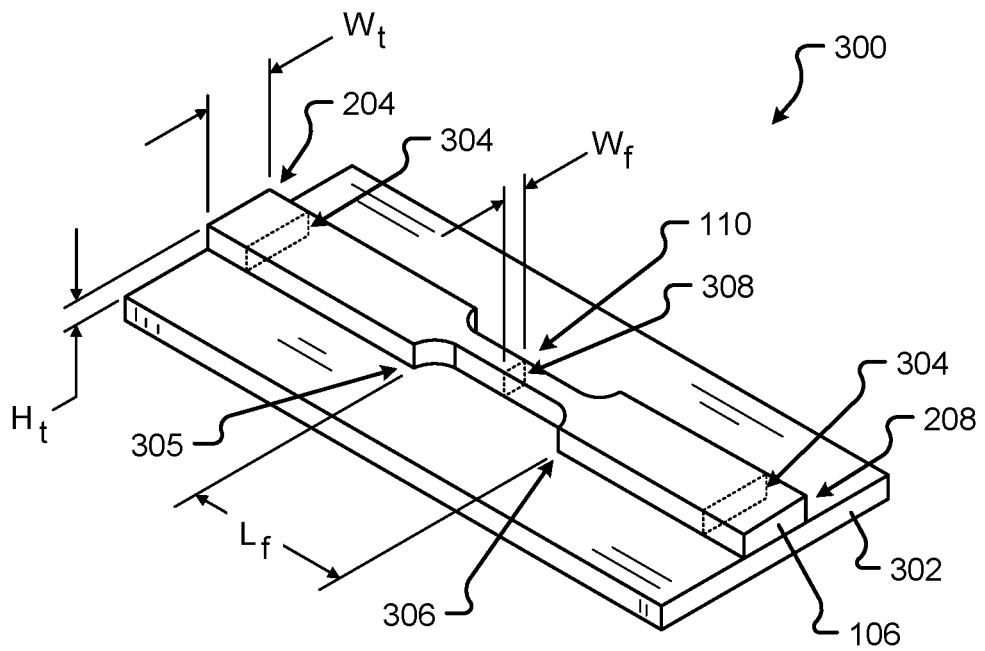
FIG. 3 is a perspective detail view of an electrical trace with an integrated fusible link in accordance with embodiments of the present disclosure.

FIG. 3 shows a perspective detail view of a section 300 of an electrical trace 106 with an integrated fusible link 110 formed on a substrate layer 302 in accordance with embodiments of the present disclosure. The substrate layer 302 may form the substantially planar surface (e.g., as described above, etc.) upon which the electrical trace 106 with fusible link 110 is formed. The substrate layer 302 may be a dielectric material (e.g., fiberglass, composite, linen, polyimide, polyether ether ketone, polyester, etc., and/or combinations thereof). The substrate layer 302 may provide a rigid or flexible surface that is capable of insulating at least a portion of the electrical trace 106 with fusible link 110 from an environment surrounding the electrical trace 106. In some embodiments, for example, where the printed circuit 104 is a flexible printed circuit, the thickness of the substrate layer 302 may be 0.025 mm, 0.050 mm, 0.075 mm, 0.100 mm, 0.125 mm, and/or variations therebetween. In one embodiment, the overall thickness of the printed circuit 104 including electrical traces 106 with fusible links 110 and one or more insulation layers (e.g., dielectric layers, thermal layers, etc.) may be between and/or including 0.050 mm and 2.0 mm.

The electrical trace 106 in FIG. 3 is shown running from a first end 204 to a second end 208 with a fusible link 110 formed therebetween. The electrical trace 106 and fusible link 110 may be made from the same material and in some cases, may be formed by depositing a continuous layer of electrically conductive material onto a substrate layer 302. In one embodiment, the electrical trace 106 may be formed from a first material at a first time and the fusible link 110, or fusible portion of the electrical trace 106, may be formed at a second time from a second different material. In any event, the electrical trace 106 may have a trace width, $W_t$, and trace height, $H_t$, running from the first end 204 of the electrical trace 106 to a first point 305 of the fusible link 110. This trace width, $W_t$, and height, $H_t$, may define the standard, or non-controlled, cross-sectional area 304 of the electrical trace 106 (e.g., the area being equal to $W_t \times H_t$). The electrical traces 106 and/or fusible links 110 described herein may be made from any electrically conductive material including, but in no way limited to, gold, silver, copper, aluminum, metal, graphene, etc., and/or other conductive materials or composites thereof.

At the first point 305 of the fusible link 110, the cross-sectional area 304 of the electrical trace 106 is reduced, or controlled, to a smaller fuse cross-sectional area 308. In one embodiment, the fusible link 110 having the controlled cross-sectional area 308 may be disposed along the middle, or substantially middle, of a length for an electrical trace 106. Among other things, disposing the fusible links 110 at, or substantially near, the middle of an electrical trace 106 isolates the overcurrent protect feature from sensitive battery cells 114A-N, battery module 108 or electronics, and/or the BMS 112. This disposition of fusible links 110 prevents an overcurrent event from causing subsequent damage to these and other components in a battery monitoring, management, and/or control system. Additionally or alternatively, the printed circuit portion including the fusible links 110 may be isolated thermally from the battery cells 114A-N and/or the BMS 112.

In some embodiments, the fusible link 110 may be sized having an arc gap length, $L_f$, and a fuse width, $W_f$. In some cases, the fusible link 110 may have the same height, $H_t$, as the electrical trace 106. This height, $H_t$, may be defined by the method of how the electrical trace 106 is formed (e.g., deposited, printed, etched, silkscreened, laser cut, wire EDM cut, waterjet cut, or otherwise machined, etc.). In any event, the fuse width, $W_f$, and trace height, $H_t$, may define the controlled, or reduced, cross-sectional area 308 of the electrical trace 106 and more specifically of the fusible link 110 (e.g., the area being equal to $W_f \times H_t$). The controlled cross-sectional area 308 may extend along a majority, or entirety, of the fusible link 110 and/or arc gap length, $L_f$. In any event, the arc gap length, $L_f$, may define a length of material for the fusible link 110 that is configured to melt in an overcurrent scenario. When melted, the arc gap length, $L_f$, provides a physical and electrical separation between the battery cells 114A-N and a busbar 120 and/or other component of an electrical system or BMS 112. The distance of the arc gap length, $L_f$, may be configured to prevent arcing between portions of a broken electrical trace 106. For instance, when broken without a sufficient arc gap length, the portion of the electrical trace 106 adjacent to the first end 204 may arc with the portion of the electrical trace 106 adjacent to the second end 208. Among other things, the arc gap length, $L_f$, prevents this potential for arcing. In some embodiments, the dimension of the arc gap length, $L_f$, may be determined based on a defined dielectric withstand voltage, temperature, pressure, a composition of the environment (e.g., gas, air, nitrogen, etc.) surrounding the electrical trace 106 and/or printed circuit 104, Paschen's law, and/or combinations thereof.

In an overcurrent scenario, it is an aspect of the present disclosure that the fusible link 110 associated with a battery cell 114A-N suffering an overcurrent event melts completely separating the electrical connection between the battery cell 114A-N and the BMS 112, or other electrical component, in the printed circuit 104.

In some embodiments, the electrical trace 106 may include a vertical interconnect access (VIA), pad, and/or other electrical interconnection disposed at each end of the fusible link 110. For instance, the printed circuit 104 may include a pad built into the electrical trace 106 at the first point 305 and the second point 306 of the fusible link 110. In some cases, the incorporated VIAs or pads disposed at either end of the fusible link 110 (e.g., first point 305 and second point 306) may allow the printed circuit 104 to be reworked after an overcurrent event without scrapping, or destroying, the entire printed circuit 104. Reworking may include removing any remaining metal forming the broken fusible link 110 and reforming, depositing, or otherwise inserting a new fusible link 110 portion between the first and second points 305, 306 and the electrical interconnections or VIAs. In some cases, a dielectric patch layer (e.g., tape, adhesive material, shrink wrap, etc.) or other nonconductive material may be placed over the reworked fusible link 110.

Figure 4:
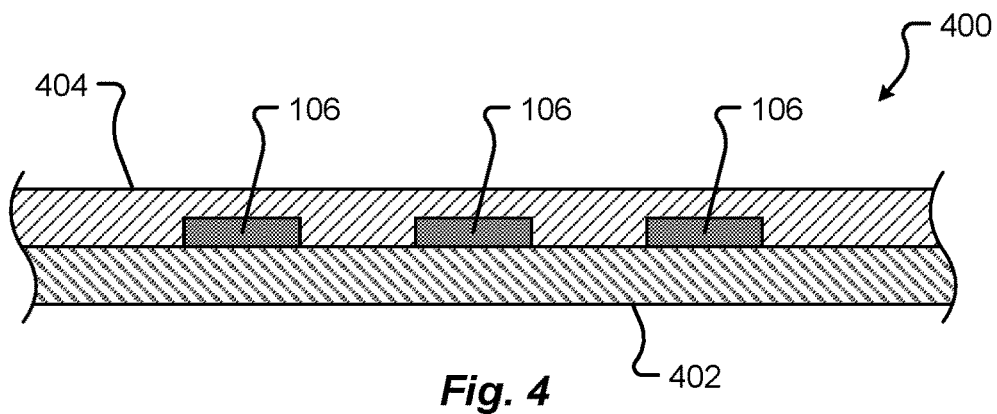
FIG. 4 is a section elevation view of a printed circuit in accordance with embodiments of the present disclosure.

FIG. 4 is a section elevation view taken through three adjacent electrical traces 106 in a printed circuit 400 in accordance with embodiments of the present disclosure. The printed circuit 400 shown in FIG. 4 may be similar, if not identical, to the printed circuits 104 described in conjunction with FIGS. 1-3 and may include one or more features described in conjunction with the printed circuits 104 described in conjunction with FIGS. 1-3, and vice versa.

The printed circuit 400 may comprise a first dielectric layer 402 defining a planar surface upon which the electrical traces 106 having fusible links 110 may be formed. The first dielectric layer 402 may be made from a dielectric material (e.g., fiberglass, composite, linen, polyimide, polyether ether ketone, polyester, etc., and/or combinations thereof). This layer 402 may provide a rigid or flexible surface that is capable of insulating at least a portion of the electrical traces 106 with fusible link 110 from one another and/or an environment surrounding the electrical traces 106. In some embodiments, for example, where the printed circuit 104 is a flexible printed circuit, the thickness of the first dielectric layer 402 may be 0.025 mm, 0.050 mm, 0.075 mm, 0.100 mm, 0.125 mm, and/or variations therebetween. In one embodiment, the overall thickness of the printed circuit 104 including electrical traces 106 with fusible links 110 and one or more insulation layers (e.g., dielectric layers, thermal layers, etc.) may be between and/or including 0.050 mm and 2.0 mm.

The electrical traces 106 may be formed, printed, silkscreened, laser cut, wire EDM cut, waterjet cut, machined, and/or otherwise deposited on the first dielectric layer 402. It is an aspect of the present disclosure that the electrical traces 106 having fusible links 110 of FIG. 4 may be equivalent to the electrical trace 106 described in conjunction with FIG. 3. In one embodiment, the electrical traces 106 and fusible links 110 may be cut (e.g., laser cut, wire electrical discharge machined (EDM), waterjet cut, or otherwise machined) from a sheet, or strip, of conductive material (e.g., copper, silver, etc.) and laminated with the first dielectric layer 402, or other layer, of the printed circuit 104, 400. In some embodiments, a second dielectric layer 404 may be formed, deposited, or overlaid, onto the electrical traces 106 and fusible links 110 as well as the first dielectric layer 402. This disposition of the electrical traces 106 between dielectric insulation layers 402, 404 may electrically insulate the electrical traces 106 from one another and/or from an environment surrounding the printed circuit 104, 400. These multiple layers of material form the printed circuit 104, 400. Although shown with only three layers of material (e.g., first dielectric layer 402, electrical traces 106, and second dielectric layer 404), it should be appreciated that the printed circuit 104, 400 may include any number of layers (e.g., more or fewer than those illustrated in FIG. 4). As shown in FIG. 4, the printed circuit 400 having integrally formed electrical traces 106 and fusible links 110 may be substantially flat in overall height.

Figure 5A:
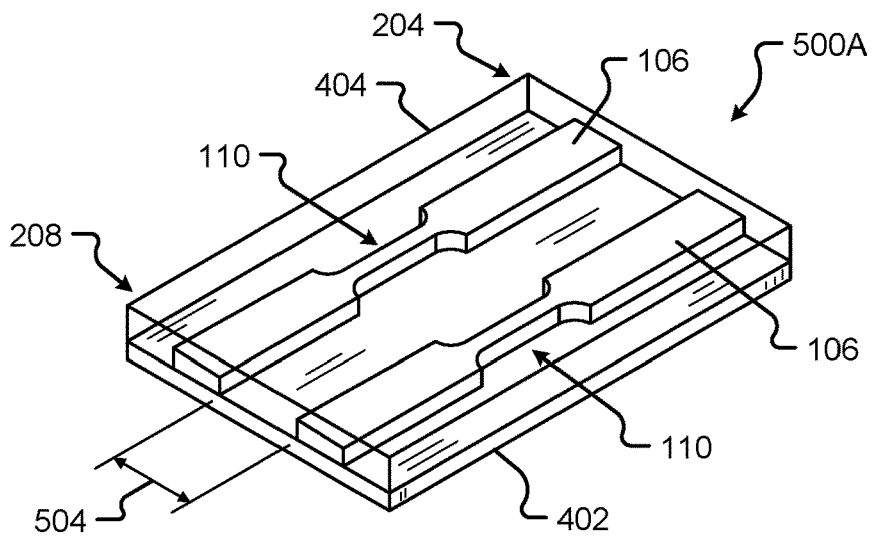
FIG. 5A is a perspective detail view of side-by-side electrical traces with adjacent integrated fusible links in accordance with embodiments of the present disclosure.
Figure 5B:
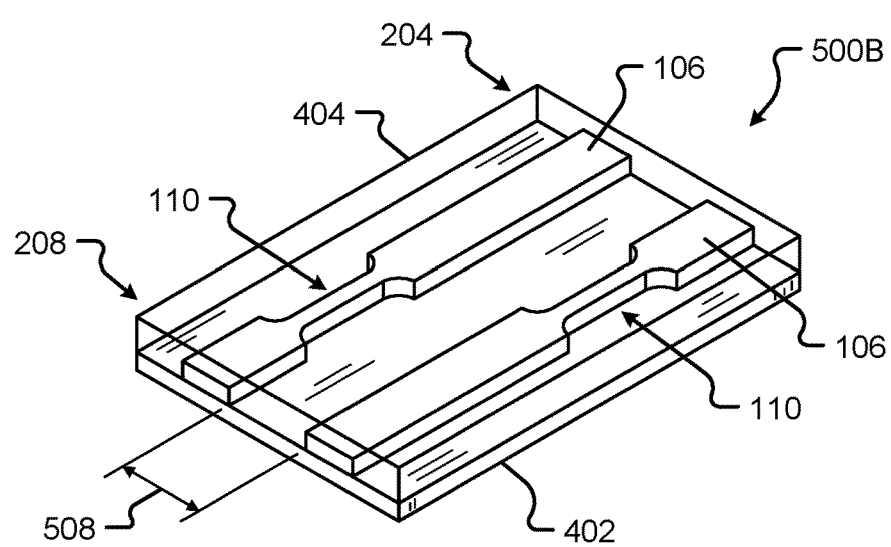
FIG. 5B is a perspective detail view of side-by-side electrical traces with staggered integrated fusible links in accordance with embodiments of the present disclosure.

FIGS. 5A and 5B show perspective detail views of a printed circuit section 500A, 500B including side-by-side electrical traces 106 in accordance with embodiments of the present disclosure. The printed circuit sections 500A, 500B shown in FIGS. 5A and 5B include a may include any number of electrical traces 106 and fusible links 110. It should be appreciated that the features, arrangement, and description associated with the printed circuit sections 500A, 500B illustrated in FIGS. 5A and 5B may apply to any printed circuit 104, 400 recited herein, and vice versa.

Each printed circuit section 500A, 500B includes a substantially flat first dielectric layer 402 upon which a number of electrical traces 106 and fusible links 110 are formed. The printed circuit sections 500A, 500B include a second dielectric layer 404 deposited on, and encapsulating, at least a portion of the electrical traces 106 and fusible links 110. In some embodiments, one or more of the dielectric layers 402, 404 as described herein may be at least partially transparent or translucent.

Referring now to FIG. 5A, a perspective detail view of a printed circuit section 500A having side-by-side electrical traces 106 with adjacent integrated fusible links 110 is shown in accordance with embodiments of the present disclosure. As shown in FIG. 5A, the electrical traces 106 with adjacent integrated fusible links 110 are separated by a side-by-side distance 504. This side-by-side distance 504 may be defined based on a total height, H, (see, e.g., FIG. 2) of the printed circuit 104, 500A. For instance, the side-by-side distance 504 may be set to accommodate a specific number of electrical traces 106 in a printed circuit 104, 500A with sufficient separation such that one electrical trace 106 does not contact another adjacent electrical trace 106 on the first dielectric layer 402. Additionally or alternatively, the side-by-side distance 504 may be defined, at least in part, based on a melt damage area associated with each fusible link 110. By way of example, in the event of an overcurrent scenario, one electrical trace 106 breaking at the fusible link 110 should be spaced such that the melting of the fusible link does not melt an adjacent electrical trace 106, fusible link 110, and/or portion thereof.

In some embodiments, the size of the printed circuit 104, 500B, or mechanical considerations, may require a closer spacing, or packing, of electrical traces 106 at a distance 508 smaller than the side-by-side distance 504 illustrated in FIG. 5A. For example, if a number of electrical traces 106 adjacent to one another melt (e.g., due to multiple overcurrent events, etc.) at the fusible links 110 in the side-by-side arrangement, the integrity of the printed circuit 104, 500A may be compromised (e.g., the melting possibly causing one or more of the dielectric layers 402, 404 to melt along the same line at the fusible links 110, etc.). This sequence of melted portions of dielectric layers 402, 404 may provide a perforation of the printed circuit 104, 500A which could tear, break, or otherwise separate, affecting the integrity of functioning battery cell connections. In this case, the fusible links 110 of adjacent electric traces 106 may be staggered, or offset, from one another as shown in FIG. 5B.

FIG. 5B shows a perspective detail view of a printed circuit section 500B having side-by-side electrical traces 106 with staggered integrated fusible links 110 in accordance with embodiments of the present disclosure. As described above, staggering or offsetting the fusible links 110 of adjacent electrical traces 106 may provide a stronger printed circuit 104, 500B in the event of adjacent electrical traces 106 suffering overcurrent events and melting a portion of one or more dielectric layers 402, 404. Additionally or alternatively, the staggered integrated fusible links 110 shown in FIG. 5B may disperse a heat generated from the scenario or events described above.

Figure 6A:
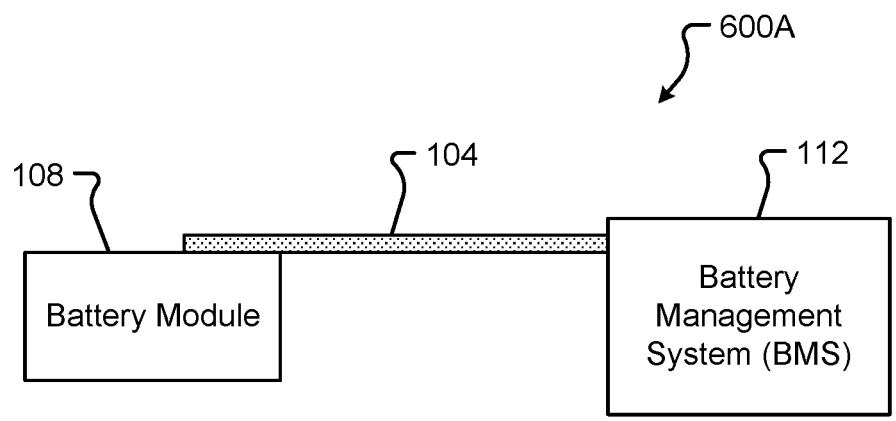
FIG. 6A is a block diagram of a rigid printed circuit with integrated fusible links in accordance with embodiments of the present disclosure.
Figure 6B:
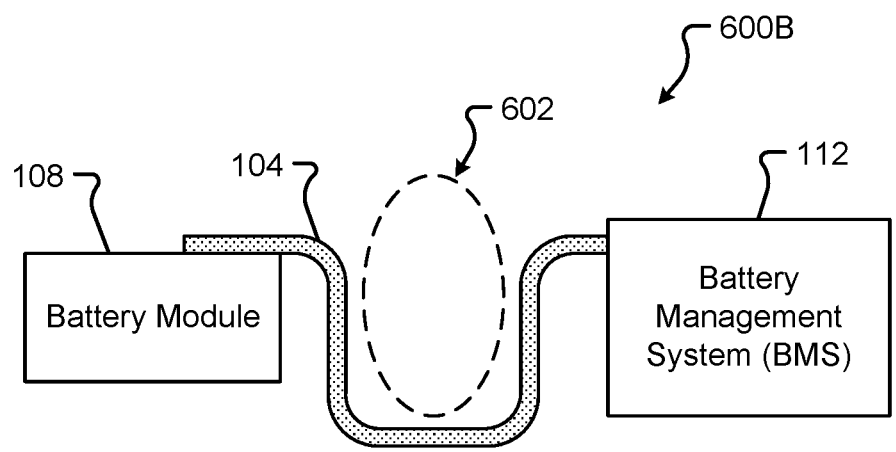
FIG. 6B is a block diagram of a flexible printed circuit with integrated fusible links in accordance with embodiments of the present disclosure.

FIGS. 6A and 6B show block diagrams of printed circuits 104 in various battery module voltage sensing systems 600A, 600B. In particular, FIG. 6A shows a rigid printed circuit 104 with integrated fusible links 110 and FIG. 6B shows a flexible printed circuit 104 with integrated fusible links in accordance with embodiments of the present disclosure. As provided above, the present disclosure describes integrating fusible links 110 into a printed circuit 104. The printed circuit 104 may be flexible or rigid in construction. For example, the printed circuit 600A may be a PCB comprising a rigid substrate layer and construction including one or more dielectric, or insulating, layers including at least one of a glass-reinforced epoxy laminate, fiberglass, fiberglass or composite cloth or linen, polyimide, etc., and/or combinations thereof. As another example, the printed circuit 608B may be a flex circuit comprising a flexible dielectric film including at least one of polyimide, polyether ether ketone, and/or polyester, etc.

In some embodiments, the flexible printed circuit 608B shown in FIG. 6B may be used to route electrical interconnections from the battery module 108 to the BMS 112 around objects 602, save space, thermally isolate the fusible links 110 from sensitive electronics, etc., and/or provide a compact routing solution to battery management solutions.

The exemplary systems and methods of this disclosure have been described in relation to electrical connections and electrical interconnect devices disposed between a battery management system and a number of battery cells in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an electrical interconnect device providing an electrical interconnection between a battery module and a battery management system, comprising: an electrical trace running from a first end at a terminal in a first battery cell in the battery module to a second end and a corresponding terminal in the battery management system, wherein the electrical trace is configured to conduct electricity from the first battery cell to the battery management system; and a fusible link portion disposed along a length of the electrical trace and between the first and second ends of the electrical trace, the fusible link portion including a controlled cross-sectional area in the electrical trace configured to melt at a predetermined electrical current and break the electrical trace and electrical interconnection between the first battery cell and the battery management system at the predetermined electrical current; wherein the electrical trace has a first cross-sectional area at the first and second ends, and wherein the controlled cross-sectional area is sized less than the first cross-sectional area.

Aspects of the above electrical interconnect device include wherein the fusible link portion is integrally formed in the electrical trace. Aspects of the above electrical interconnect device include wherein the electrical trace and the fusible link portion are formed on a first planar surface of a dielectric substrate layer. Aspects of the above electrical interconnect device include wherein the electrical trace and the fusible link portion provide a continuous electrical pathway on the dielectric substrate layer extending from the first end to the second end of the electrical trace. Aspects of the above electrical interconnect device include wherein the electrical trace includes a height offset from and substantially parallel to the first planar surface of the dielectric substrate layer, wherein the height is constant along the continuous electrical pathway layer. Aspects of the above electrical interconnect device include wherein the controlled cross-sectional area of the fusible link portion includes an arc prevention gap having a fuse width less than a width of the electrical trace. Aspects of the above electrical interconnect device include wherein a material of the electrical trace is identical to a material of the fusible link portion. Aspects of the above electrical interconnect device include wherein the dielectric substrate layer is a rigid printed circuit board. Aspects of the above electrical interconnect device include wherein the dielectric substrate layer is a flexible plastic substrate. Aspects of the above electrical interconnect device include wherein the flexible plastic substrate is a flexible dielectric film comprising at least one of polyimide, polyether ether ketone, and/or polyester. Aspects of the above electrical interconnect device include wherein the flexible plastic substrate, the electrical trace, and the fusible link portion are substantially flat running from the first end of the electrical trace to the second end of the electrical trace.

Embodiments include a printed circuit with integrated fusible links, comprising: a dielectric substrate layer having a width and length forming a first planar surface; a plurality of electrical traces disposed on the first planar surface of the dielectric substrate layer, wherein an electrical trace of the plurality of electrical traces comprises: a first end; a second end disposed opposite the first end and running along the length of the dielectric substrate layer; and a fusible link disposed between the first end and the second end of the electrical trace, wherein the fusible link includes a controlled cross-sectional area in the electrical trace configured to melt at a predetermined electrical current and break the electrical trace at the predetermined electrical current, wherein the electrical trace has a first cross-sectional area at the first end and the second end, and wherein the controlled cross-sectional area is sized less than the first cross-sectional area.

Aspects of the above printed circuit include wherein the fusible link is integrally formed in the electrical trace. Aspects of the above printed circuit include wherein the plurality of electrical traces include a height offset from and substantially parallel to the first planar surface of the dielectric substrate layer, and wherein the height is constant along the length of the dielectric substrate layer. Aspects of the above printed circuit include wherein the controlled cross-sectional area of the fusible link includes an arc prevention gap having a fuse width less than a width of the electrical trace. Aspects of the above printed circuit include wherein a material of the electrical trace is identical to a material of the fusible link. Aspects of the above printed circuit include wherein the dielectric substrate layer is a rigid printed circuit board. Aspects of the above printed circuit include wherein the dielectric substrate layer is a flexible plastic substrate including a flexible dielectric film comprising at least one of polyimide, polyether ether ketone, and/or polyester, and wherein the flexible plastic substrate and the plurality of electrical traces are substantially flat running from the first end of the electrical trace to the second end of the electrical trace.

Embodiments include a battery module voltage sensing system, comprising: a printed circuit with integrated fusible links, comprising: a dielectric substrate layer having a width and length forming a first planar surface; a plurality of electrical traces disposed on the first planar surface of the dielectric substrate layer, wherein an electrical trace of the plurality of electrical traces comprises: a first end; a second end disposed opposite the first end and running along the length of the dielectric substrate layer; and a fusible link disposed between the first end and the second end of the electrical trace, wherein the fusible link includes a controlled cross-sectional area in the electrical trace configured to melt at a predetermined electrical current and break the electrical trace at the predetermined electrical current, wherein the electrical trace has a first cross-sectional area at the first end and the second end, and wherein the controlled cross-sectional area is sized less than the first cross-sectional area; a battery cell in a battery module; and a battery management controller electrically interconnected with the battery cell via the electrical trace in the printed circuit, wherein the battery management controller is configured to sense a voltage from the battery cell via the electrical trace.

Aspects of the above battery module voltage sensing system include wherein the printed circuit is a flexible printed circuit comprising a flexible dielectric film comprising at least one of polyimide, polyether ether ketone, and/or polyester, and wherein the flexible printed circuit is substantially flat and flexible from the first end of the electrical trace to the second end of the electrical trace.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. An electrical interconnect device providing an electrical interconnection between a battery module and a battery management system, comprising:

a first dielectric substrate layer comprising a first planar surface and a second planar surface disposed opposite the first planar surface by a thickness of the first dielectric substrate layer;

a first electrical trace formed from an electrically conductive material directly on the first planar surface of the dielectric layer, the first electrical trace running a first length from a first end of the first electrical trace electrically interconnected with a positive terminal of a first battery cell in the battery module to a second end of the first electrical trace disposed at a corresponding first terminal of the battery management system, wherein the first electrical trace provides a voltage measurement of the first battery cell to the battery management system;

a first fusible link portion integrally formed in the first electrical trace on the first planar surface and disposed along a middle of the first length of the first electrical trace between the first and second ends of the first electrical trace, the first fusible link portion including a first controlled cross-sectional area in the first electrical trace configured to melt at a predetermined electrical current and break the first electrical trace and the electrical interconnection between the positive terminal of the first battery cell and the first terminal of the battery management system at the predetermined electrical current, wherein a total length of the first controlled cross-sectional area runs from a first point along the middle of the first length of the first electrical trace to a second point along the middle of the first length of the first electrical trace, wherein a width of the first controlled cross-sectional area running from the first point to the second point is disposed entirely within a width of the first electrical trace measured at the first point and at the second point, and wherein the width of the first controlled cross-sectional area tapers to the width of the first electrical trace at the first point and at the second point;

a second electrical trace formed from the electrically conductive material directly on the first planar surface of the dielectric layer immediately adjacent to the first electrical trace, the second electrical trace running a second length from a first end of the second electrical trace electrically interconnected with a positive terminal of a second battery cell in the battery module to a second end of the second electrical trace disposed at a corresponding second terminal of the battery management system, wherein the second electrical trace provides a voltage measurement of the second battery cell to the battery management system, and wherein the second battery cell is disposed immediately adjacent to the first battery cell in the battery module;

a second fusible link portion integrally formed in the second electrical trace on the first planar surface and disposed along a middle of the second length of the second electrical trace between the first and second ends of the second electrical trace, the second fusible link portion including a second controlled cross-sectional area in the second electrical trace configured to melt at a predetermined electrical current and break the second electrical trace and the electrical interconnection between the positive terminal of the second battery cell and the second terminal of the battery management system at the predetermined electrical current; and a second dielectric substrate layer comprising a contact surface and an outer surface disposed opposite the contact surface by a thickness of the second dielectric substrate layer, wherein the contact surface of the second dielectric substrate layer is disposed in direct contact with the first planar surface of the first dielectric substrate layer, the first electrical trace, and the second electrical trace;

wherein the first electrical trace has a first cross-sectional area at the first and second ends, and wherein the first controlled cross-sectional area is sized less than the first cross-sectional area.

2. The electrical interconnect device of claim 1, wherein a portion of the second dielectric substrate layer disposed in contact with the first planar surface of the first dielectric substrate layer between the first electrical trace and the second electrical trace electrically insulate the first electrical trace from the second electrical trace.

3. The electrical interconnect device of claim 2, wherein the electrical interconnect device is flexible, wherein an object is disposed between the battery module and the battery management system, and wherein the electrical interconnect device is routed around the object by flexing the electrical interconnect device out of plane from the first planar surface.

4. The electrical interconnect device of claim 2, wherein the first electrical trace and the first fusible link portion provide a continuous uninterrupted electrical pathway extending from the first end to the second end of the first electrical trace.

5. The electrical interconnect device of claim 4, wherein the first electrical trace includes a height offset from and substantially parallel to the first planar surface of the first dielectric substrate layer, wherein the height is constant along the continuous uninterrupted electrical pathway.

6. The electrical interconnect device of claim 5, wherein the total length of the first controlled cross-sectional area of the first fusible link portion provides an arc prevention gap between the first point and the second point.

7. The electrical interconnect device of claim 1, wherein the first electrical trace, the first and the fusible link portion, the second electrical trace, and the second fusible link portion are printed onto the formed on a first planar surface and wherein an overall height of the electrical interconnect device is between 0.050 mm and 2.0 mm.

8. The electrical interconnect device of claim 5, wherein the first dielectric substrate layer is a rigid printed circuit board.

9. The electrical interconnect device of claim 5, wherein the first dielectric substrate layer and the second dielectric substrate layer are flexible plastic substrates.

10. The electrical interconnect device of claim 9, wherein the flexible plastic substrates are flexible dielectric films comprising at least one of a polyimide, polyether ether ketone, and/or polyester.

11. The electrical interconnect device of claim 10, wherein the flexible plastic substrates, the first electrical trace, the second electrical trace, the first fusible link portion, and the second fusible link portion are substantially flat.

12. A printed circuit with integrated fusible links, comprising:

a first dielectric substrate layer having a substrate width and a substrate length forming a first planar surface;

a plurality of electrical traces disposed on the first planar surface of the first dielectric substrate layer, wherein each electrical trace of the plurality of electrical traces is interconnected with a positive terminal of a respective battery cell in a battery module, and wherein each electrical trace of the plurality of electrical traces is an electrical trace comprising:
a first end;
a second end disposed opposite the first end;
a length running along the substrate length from the first end to the second end; and
a fusible link integrally formed in the electrical trace formed on the first planar surface and disposed between the first end and the second end of the electrical trace, wherein the fusible link includes a controlled cross-sectional area in the electrical trace configured to melt at a predetermined electrical current and break the electrical trace at the predetermined electrical current, wherein a total length of the controlled cross-sectional area runs from a first point along the length of the electrical trace to a second point along the length of the electrical trace, wherein a width of the controlled cross-sectional area running from the first point to the second point is disposed entirely within a width of the electrical trace measured at the first point and at the second point, wherein the electrical trace has a first cross-sectional area at the first end and a second cross-sectional area at the second end, and wherein the controlled cross-sectional area is sized less than each of the first and second cross-sectional areas;
wherein the plurality of electrical traces comprises a first electrical trace and a second electrical trace disposed immediately adjacent one another, wherein the first electrical trace is interconnected with a positive terminal of a first battery cell in the battery module, wherein the second electrical trace is interconnected with a positive terminal of a second battery cell in the battery module, wherein the second battery cell is disposed immediately adjacent to the first battery cell in the battery module, wherein the length of the first electrical trace runs in a first direction along the substrate length, wherein the length of the second electrical trace runs in the first direction offset a parallel spacing distance from the first electrical trace, wherein the fusible link of the first electrical trace is disposed along the length of the first electrical trace at a first position, wherein the fusible link of the second electrical trace is disposed along the length of the second electrical trace at a second position offset from the first position in the first direction, and wherein the controlled cross-sectional area of the first electrical trace is completely offset from the controlled cross-sectional area of the second electrical trace in the first direction; and
a second dielectric substrate layer sized having the substrate width and the substrate length and comprising a contact surface and an outer surface disposed opposite the contact surface by a thickness of the second dielectric substrate layer, wherein the contact surface of the second dielectric substrate layer is disposed in direct contact with the first planar surface of the first dielectric substrate layer at points between adjacent electrical traces of the plurality of electrical traces as well as in direct contact with each electrical trace of the plurality of electrical traces.

13. The printed circuit of claim 12, wherein the width of the controlled cross-sectional area tapers to the width of the electrical trace at the first point and at the second point.

14. The printed circuit of claim 13, wherein the plurality of electrical traces includes a height offset from and substantially parallel to the first planar surface of the first dielectric substrate layer, and wherein the height is constant along the substrate length of the first dielectric substrate layer.

15. The printed circuit of claim 14, wherein the total length of the controlled cross-sectional area of the fusible link provides an arc prevention gap between the first point and the second point.

16. The printed circuit of claim 14, wherein a center of the width of the controlled cross-sectional area follows a middle of the electrical trace from the first point to the second point.

17. The printed circuit of claim 14, wherein the first dielectric substrate layer is a rigid printed circuit board.

18. The printed circuit of claim 14, wherein the first dielectric substrate layer is a flexible plastic substrate including a flexible dielectric film comprising at least one of a polyimide, polyether ether ketone, and/or polyester, and wherein the flexible plastic substrate and the plurality of electrical traces are substantially flat running from the first end of the electrical trace to the second end of the electrical trace.

19. A battery module voltage sensing system, comprising:
a plurality of battery cells in a battery module;
a printed circuit with integrated fusible links; comprising:
a first dielectric substrate layer having a substrate width and a substrate length forming a first planar surface;
a plurality of electrical traces disposed on the first planar surface of the first dielectric substrate layer, wherein each electrical trace of the plurality of electrical traces is interconnected with a positive terminal of a respective battery cell of the plurality of battery cells in the battery module, and wherein each electrical trace of the plurality of electrical traces is an electrical trace comprising:
a first end;
a second end disposed opposite the first end;
a length running along the substrate length from the first end to the second end; and
a fusible link integrally formed in the electrical trace formed on the first planar surface and disposed between the first end and the second end of the electrical trace, wherein the fusible link includes a controlled cross-sectional area in the electrical trace configured to melt at a predetermined electrical current and break the electrical trace at the predetermined electrical current, wherein a total length of the controlled cross-sectional area runs from a first point along the length of the electrical trace to a second point along the length of the electrical trace, and wherein a width of the controlled cross-sectional area running from the first point to the second point is disposed entirely within a width of the electrical trace measured at the first point and at the second point, wherein the electrical trace has a first cross-sectional area at the first end and a second cross-sectional area at the second end, and wherein the controlled cross-sectional area is sized less than each of the first and second cross-sectional areas;
wherein the plurality of electrical traces comprises a first electrical trace and a second electrical trace disposed immediately adjacent one another, wherein the first electrical trace is interconnected with a positive terminal of a first battery cell in the battery module, wherein the second electrical trace is interconnected with a positive terminal of a second battery cell in the battery module, wherein the second battery cell is disposed immediately adjacent to the first batte cell in the battery module, wherein the length of the first electrical trace runs in a first direction along the substrate length, wherein the length of the second electrical trace runs in the first direction offset a parallel spacing distance from the first electrical trace, wherein the fusible link of the first electrical trace is disposed along the length of the first electrical trace at a first position, wherein the fusible link of the second electrical trace is disposed along the length of the second electrical trace at a second position offset from the first position in the first direction, and wherein the controlled cross-sectional area of the first electrical trace is completely offset from the controlled cross-sectional area of the second electrical trace in the first direction; and a battery management controller electrically interconnected with each battery cell of the plurality of battery cells via the plurality of electrical traces in the printed circuit, wherein the battery management controller senses a voltage provided by each battery cell of from the plurality of battery cells via each electrical trace of the plurality of electrical traces.

20. The battery module voltage sensing system of claim 19, wherein the printed circuit further comprises:

a second dielectric substrate layer sized having the substrate width and the substrate length and comprising a contact surface and an outer surface disposed opposite the contact surface by a thickness of the second dielectric substrate layer, wherein the contact surface of the second dielectric substrate layer is disposed in direct contact with the first planar surface of the first dielectric substrate layer at points between adjacent electrical traces of the plurality of electrical traces as well as in direct contact with each electrical trace of the plurality of electrical traces, and wherein the printed circuit is a flexible printed circuit comprising a flexible dielectric film comprising at least one of a polyimide, polyether ether ketone, and/or polyester, and wherein the flexible printed circuit is substantially flat and flexible from the first end of the electrical trace to the second end of the electrical trace.

* * * * *